United States Patent [19]

Ohyama et al.

[11] 4,442,998

[45] Apr. 17, 1984

[54] ELECTROMAGNETIC VALVE UNIT

[75] Inventors: Tadashi Ohyama; Shoji Kawata, both of Okazaki, Japan

[73] Assignee: Aisin Seiki Kabushiki Kaisha, Kariya, Japan

[21] Appl. No.: 424,612

[22] Filed: Sep. 27, 1982

Related U.S. Application Data

[63] Continuation of Ser. No. 169,458, Jul. 16, 1980, abandoned.

[30] Foreign Application Priority Data

Jul. 24, 1979 [JP] Japan .................................. 54-94588
Jul. 24, 1979 [JP] Japan ........................... 54-102926[U]

[51] Int. Cl.³ ............................................ F16K 31/02
[52] U.S. Cl. ................................ 251/129; 137/625.5; 251/282; 251/335 B; 335/255
[58] Field of Search .......... 60/289; 137/625.5, 625.65; 251/129, 335 B, 282; 335/255, 261

[56] References Cited

U.S. PATENT DOCUMENTS

| | | | |
|---|---|---|---|
| 2,750,962 | 6/1956 | Kreitchman et al. | 251/129 X |
| 2,934,090 | 4/1960 | Kenann et al. | 137/625.5 |
| 3,168,242 | 2/1965 | Diener | 335/261 X |
| 3,788,597 | 1/1974 | Ichioka | 251/129 |
| 3,791,408 | 2/1974 | Saitou et al. | 251/129 X |
| 3,851,285 | 11/1974 | Rothfuss et al. | 251/129 X |
| 3,878,859 | 4/1975 | Grob et al. | 251/129 X |
| 3,945,399 | 3/1976 | Tirelli | 251/129 X |
| 4,240,266 | 12/1980 | Scrine et al. | 251/282 X |
| 4,250,922 | 2/1981 | Will et al. | 137/625.65 |
| 4,270,504 | 6/1981 | Sciotti et al. | 137/625.5 X |

*Primary Examiner*—Gerald A. Michalsky
*Attorney, Agent, or Firm*—Oblon, Fisher, Spivak, McClelland & Maier

[57] ABSTRACT

In combination with a flow control valve assembly, an electromagnetic motor assembly includes a stationary core surrounded by a solenoid coil at its small diameter portion, a yoke member coaxially spaced from the stationary core and having an axial hole coaxial with the small diameter portion of the stationary core, and a movable core arranged between the stationary core and the yoke member. The stationary core is formed at its inner end with an annular recess, and the movable core is at its inner end with an annular projection to be coupled within the recess with a predetermined clearance.

1 Claim, 2 Drawing Figures

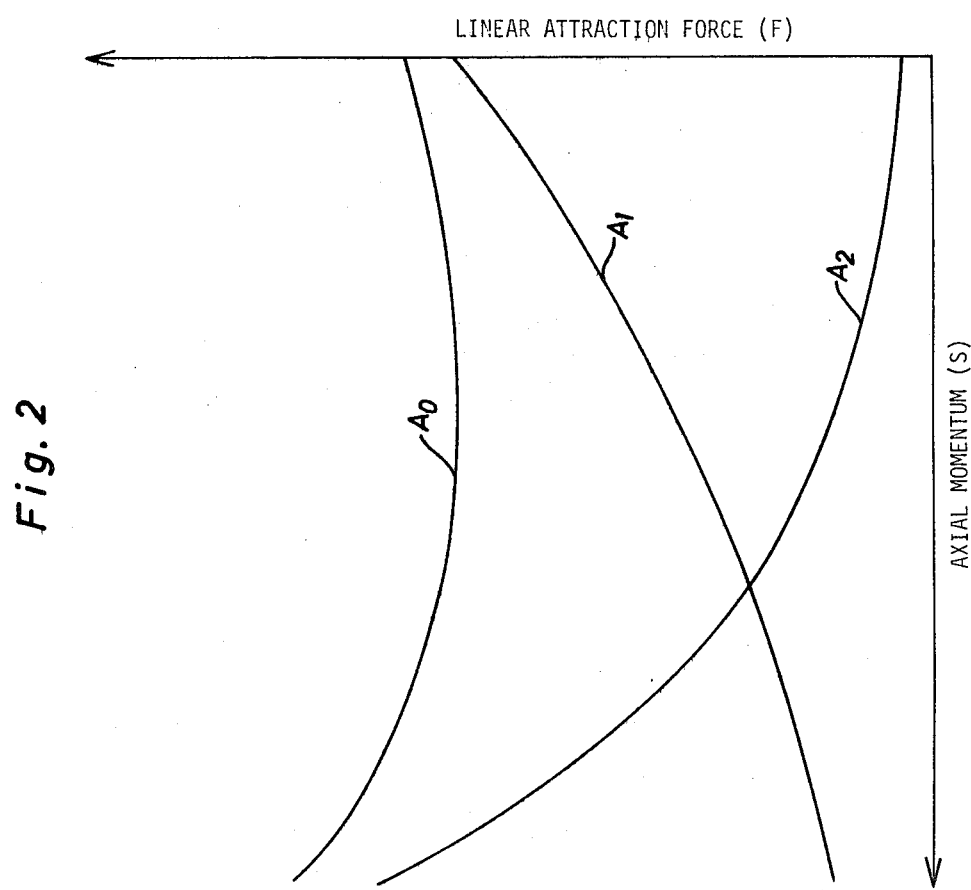

ELECTROMAGNETIC VALVE UNIT

This is a continuation of application Ser. No. 169,458, filed July 16, 1980 now abandoned.

BACKGROUND OF THE INVENTION

1. Field of the Invention

The present invention relates to electromagnetic valve units, and more particularly to an improvement of an electromagnetic valve unit which includes a flow control valve assembly for controlling the flow of fluid passing therethrough and an electromagnetic motor assembly for actuating the valve assembly in accordance with an electric current applied thereto from an electric power source.

2. Description of the Prior Art

In such a conventional motor assembly as described above, a stationary core and a movable core are coaxially arranged with respect to each other and surrounded by a solenoid coil within a motor housing. The movable core is also arranged between the stationary core and a yoke member to be axially moved by linear attraction force acting thereon in accordance with an electric current applied to the solenoid coil from the electric power source. In operation of the motor assembly of this type, when the solenoid coil is energized by a constant current from the electric power source, linear attraction force acting on the movable core changes in accordance with axial movement of the movable core. It is, therefore, difficult to conduct axial movement of the movable core in proportion to a value of the electric current applied to the solenoid coil.

Furthermore, in such a conventional valve unit as described above, a valve element of the valve assembly is secured to one end of a shaft integral with the movable core or directly secured to the movable core. As a result of the arrangement of the valve element related to the moveable core, it is difficult to ensure concentricity of the yoke member and the movable core within the motor housing and of a valve seat cooperating with the valve element within the valve housing. This hinders axial movement of the movable core and operation of the valve assembly.

SUMMARY OF THE INVENTION

It is, therefore, a primary object of the present invention to provide an improved electromagnetic valve unit capable of conducting axial movement of the movable core in proportion to a value of the electric current applied to the solenoid coil.

Another object of the present invention is to provide an improved electromagnetic valve unit capable of ensuring concentricity of the yoke member and the movable core within the motor housing and of the valve seat and the valve element within the valve housing.

A further object of the present invention is to provide an improved electromagnetic valve unit in which the motor and valve assemblies are independently completed to enhance productivity of the valve unit by division of work.

According to the present invention briefly summarized, there is provided an improved electromagnetic motor assembly for the above-noted valve unit which includes a cylindrical housing of magnetic material provided at its opposite ends with first and second fitting faces, a solenoid coil wound around a bobbin and concentrically assembled within the housing, the solenoid coil being connected to an electric power source. The motor assembly further includes a stationary core of magnetic material having a large diameter portion fixed to the first fitting face of the housing and a small diameter portion surrounded by the solenoid coil through the bobbin, the small diameter portion of the stationary core being formed at the inner end thereof with one of an annular recess and an annular projection to be coupled within the recess with a predetermined clearance, an annular yoke member of magnetic material fixed at its outer periphery to the second fitting face of the housing and having an inner periphery coaxial with the small diameter portion of the stationarey core, a movable core of magnetic material arranged between the stationary core and the yoke member and having an inner end facing to the inner end of the stationary core and an outer periphery radially spaced from the inner periphery of the yoke member with a predetermined annular clearance, the movable core being formed at the inner end thereof with the other one of the annular recess and projection and being operatively connected to the flow control valve assembly, and a resilient member for biasing the movable core toward its assembled position.

BRIEF DESCRIPTION OF THE DRAWINGS

Additional objects and advantages of the present invention will be more readily apparent from the following detailed description of a preferred embodiment thereof when taken together with the accompanying drawings in which:

FIG. 2 illustrates a graph showing linear attraction force in relation to axial movement of a movable core.

DETAILED DESCRIPTION OF THE PREFERRED EMBODIMENT

Figure 1:
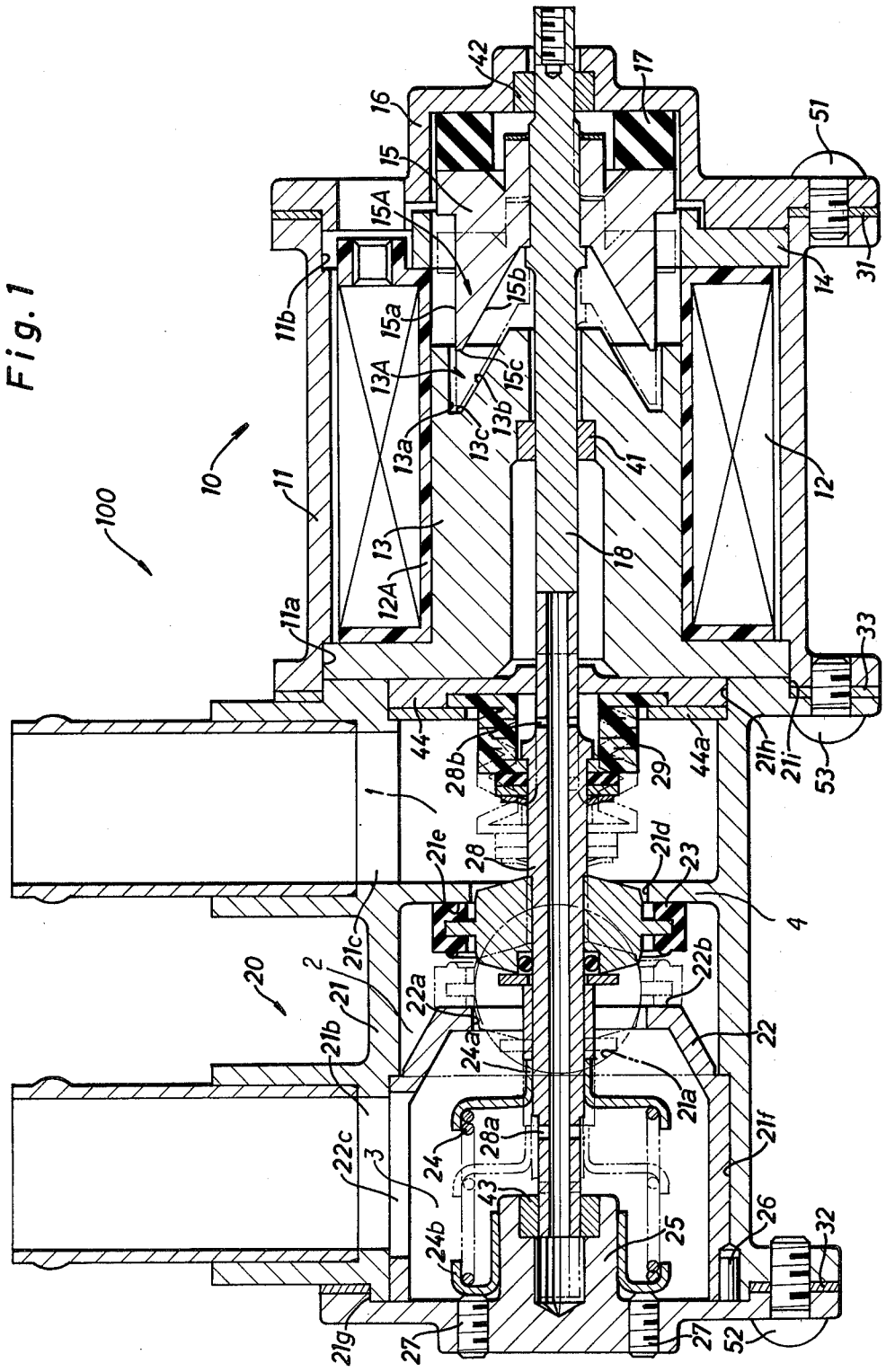
FIG. 1 is a sectional view of an electromagnetic valve unit in accordance with the present invention.

With reference to the drawings, FIG. 1 illustrates an electromagnetic valve unit 100 which is adapted for use in a secondary air supplying device for an exhaust gas purification system of an internal combustion engine. The valve unit 10 includes an electromagnetic motor assembly 10 and a flow control valve assembly 20. The motor assembly 10 includes, as its main structural parts, a cylindrical housing 11, a solenoid coil 12 arranged within housing 11, a stationary core 13 fixed to the left side of housing 11, an annular yoke member 14 fixed to the right side of housing 11, and a movable core 15 located between stationary core 13 and yoke member 14. The housing 11 is made of magnetic material and provided at its opposite ends with a pair of coaxial inner bores 11a and 11b. A holder member 16 is secured to the right end of housing 11 through an annular gasket 31 by means of fastening screws 51. The solenoid coil 12 is wound around a bobbin 12A of synthetic resin which is assembled around a small diameter portion of stationary core 13.

The stationary core 13 is made of magnetic material and has a large diameter portion coupled within the inner bore 11a of housing 11 and an xial stepped bore in which a bearing 41 is fixed in place. The stationary core 13 is further provided at its right end with an annular recess 13A which has a V-shaped cross-section. The annular recess 13A opens toward the movable core 15 and is formed with a straight peripheral wall 13a, a tapered wall 13b and an annular bottom wall 13c. The annular yoke member 14 is made of magnetic material which is secured in place by engagement with holder member 16 within the inner bore 11b of housing 11. The holder member 16 is made of aluminum and provided at its inner bore with a bearing 42 which is aligned with the bearing 41. An annular buffer 17 of synthetic rubber is adhered to the inner wall of holder member 16 to resiliently receive the movable core 15 thereon.

The movable core 15 is made of magnetic material and provided at its left end with an annular projection 15A to be coupled within the annular recess 13A of stationary core 13. The annular projection 15A of movable core 15 includes an outer peripheral wall 15a of which diameter is slightly smaller than that of the peripheral wall 13a of recess 13A, a tapered wall 15b corresponding with the tapered wall 13b of recess 13A, and an annular end wall 15c. A first shaft 18 of non-magnetic material is slidably supported by the pair of bearings 41 and 42 respectively from stationary core 13 and holder member 16, and the movable core 15 is fixedly carried on the first shaft 18 to be moved in the axial direction. In addition, the movable core 15 is radially spaced at its right end from the inner periphery of yoke member 14 with an annular clearance.

The flow control valve assembly 20 includes, as its main parts, a valve housing 21, a sleeve member 22 assembled within the left-hand portion of housing 21, a valve seat 21e formed on a partition wall of housing 21, a valve member 23 cooperable with the valve seat 21e, and a compression coil spring 24 biasing the valve member 23 toward the valve seat 21e. The valve housing 21 is closed by a holder member 25 which is secured by fastening screws 52 to the left end of housing 21 through an annular gasket 32. The housing 21 is made of aluminum and provided at its central portion with a port 21a for connection to an air pump (not shown). The housing 21 is also provided at its left-hand portion with a radial port 21b in open communication with the atmosphere and at its right-hand portion with a radial port 21c for connection to an exhaust pipe of the internal combustion engine. The partition wall 4 of housing 21 is located between the ports 21b and 21c and is formed with a valve hole 21d surrounded by the valve seat 21e and partially partitions chamber 1 from chamber 2 and 3.

The valve housing 21 is further provided at its left-hand portion with an inner bore 21f and an annular shoulder 21g and at its right-hand portion with an inner bore 21h and an annular shoulder 21i. The inner bore 21f and shoulder 21g are arranged perpendicularly to the valve seat 21e and coaxially with the inner bore 21h and shoulder 21i. Thus, the valve housing 21 is coaxially coupled at its shoulder 21i within the inner bore 11a of motor housing 11 through an annular gasket 33 and secured to the housing 11 by fastening screws 53. The sleeve member 22 is made of aluminum, and it is coaxially coupled within the inner bore 21f of housing 21 and partially partitions chamber 1 from chambers 2 and 3. The axial movement of sleeve member 22 is restricted by engagement with the inner wall of holder member 25, and the rotation of sleeve member 22 is also restricted by a pin 26, which is inserted between the outer periphery of sleeve member 22 and the inner periphery of housing 21. The right end of sleeve member 22 is formed as a valve seat 22b with a valve hole 22a perpendicular to the axis of the housing assemblies, and the peripheral wall of sleeve member 22 is formed with a radial hole 22c opening toward the port 21b.

The holder member 25 is made of aluminum, and it is coaxially coupled over the shoulder 21g of housing 21 through annular gasket 32. The holder member 25 is formed at the center thereof with an annular boss to which a bearing 43 is fixed in place, and a pair of adjusting screws 27 are threaded into holder member 25 in the axial direction. A second tubular shaft 28 is slidably supported at its left-hand by the bearing 43 from holder member 25 and at its right-hand by a closure member 44, which is sealingly coupled within the inner bore 21h of housing 21 through a retainer plate 44a. Thus, the second tubular shaft 28 is aligned with the first shaft 18 and abuts at its right end against the left end of first shaft 18. A bellows 29 is attached at its one end to the right-hand of tubular shaft 28 and secured by the retainer plate 44a at its other end to sealingly close the sliding portion between shaft 28 and closure member 44. The second shaft 28 is further provided with a pair of radial holes 28a, 28b to ensure smooth inflation and deflation of bellows 29. In addition, the valve member 23 is sealingly carried on the tubular shaft 28 to be moved in the axial direction, and the compression coil spring 24 is engaged at its one end with the valve member 23 through a retainer assembly 24a and at its other end with the adjusting screws 27 through a retainer member 24b.

With the assembling construction of the valve unit 100 described above, it is able to concentrically assemble in a precise manner the yoke member 14, movable core 15 and stationary core 13 within the motor housing 11, and it is also able to concentrically arrange in a precise manner the valve member 23 and valve seats 21e, 22b within the valve housing 21. Even if the coaxial coupling were not obtained between the two housings 11 and 21, smooth axial movement of the movable core 15 and accurate operation of the flow control valve 20 would be expected. Furthermore, it is able to enhance productivity of the valve unit 100 by division of work because the motor and valve assemblies 10 and 20 are independently completed.

In operation of the motor assembly 10, a constant current applied to solenoid coil 12 will generate linear attraction force F between the inner periphery of yoke member 14 and the outer periphery of the right end of movable core 15 and between the peripheral wall 13a of recess 13A of stationary core 13 and the outer peripheral wall 15a of annular projection 15A of movable core 15. The linear attraction force F will decrease in accordance with leftward momentum S of movable core 15 as shown by a characteristic curve $A_1$ in FIG. 2. Subsequently, the constant current to solenoid coil 12 will generate linear attraction force between the tapered wall 13b of recess 13A and the tapered wall 15b of projection 15A and between the annular bottom wall 13c of recess 13A and the annular end wall 15c of projection 15A. The linear attraction force F will increase in accordance with the leftward momentum S of movable core 15 as shown by a characteristic curve $A_2$ in FIG. 2. This results in relatively large linear attraction force F acting on the movable core 15 regardless of its leftward movement as shown by a characteristic curve $A_0$ in FIG. 2. Therefore, the pre-load of compression coil spring 24 can be determined in a relatively high value without undesired influence in operation of the valve unit 100. This serves to eliminate undesired vibration of the movable core 15 and valve member 23 during deenergization of the solenoid coil 12 and to conduct the leftward movement of movable core 15 sustantially proportional to a value of the current applied to solenoid coil 12.

During deenergization of the solenoid coil 12, the valve member 23 is pressed into contact with the valve seat 21e under the pre-load of spring 24 to fully close the valve hole 21d and to fully open the valve hole 22a, while the movable core 15 is resiliently held in its original position due to engagement of the first shaft 18 with the second shaft 28. Under this condition, the compressed air from the air pump is supplied into the interior of housing 21 through port 21a and is exhausted into the atmosphere through ports 22a and 21b. When the solenoid coil 12 is energized by a direct current from an electric power souce, a magnetic flux passes across the motor housing 11, stationary core 13, movable core 15 and yoke member 14 to generate linear attraction force acting on the movable core 15 in proportion to the value of the direct current, as previously described. Then, the movable core 15 smoothly moves against biasing force of spring 24 in the leftward direction, and, in turn, the valve member 23 moves leftward in response to the axial movement of movable core 15 to open the valve hole 21d. This results in control of the quantity of the compressed air supplied into the exhaust pipe across ports 21a, 21d and 21c. When the valve member 23 is pressed into contact with the valve seat 22b due to the linear attraction force acting on movable core 15, all the compressed air from the air pump is supplied into the exhaust pipe of the engine.

Although a certain specific embodiment of the present invention has been shown and described, it is obvious that many modifications thereof are possible. For example, in the actual practice of the present invention, the annular recess and projection 13A and 15A may be formed on the left end of movable core 15 and the right end of stationary core 13 respectively, and each cross-section of the annular recess and projection 13A and 15A may be modified in another appropriate cross-section. The invention, therefore, is not intended to be restricted to the exact showing of the drawings and description thereof, but is considered to include reasonable and obvious equivalents.

What is claimed is:

1. An electromagnetic valve unit including a flow control valve assembly or controlling the flow of fluid passing therethrough and operatively associated with an electromagnetic motor assembly for actuating said valve assembly in response to an electric current applied thereto from an electric power source, said motor assembly comprising:

a cylindrical housing of magnetic material provided at opposite ends thereof with first and second fitting faces;

a solenoid coil concentrically assembled within said housing and connected to said electric power source;

a stationary core of magnetic material fixed to said first fitting face of said housing and surrounded by said solenoid coil;

an annular yoke member of magnetic material fixed to said second fitting face of said housing;

a movable core of magnetic material arranged to be axially moved between said stationary core and said yoke member and being operatively connected to said flow control valve assembly, said stationary core and said movable core have confronting ends;

resilient means for biasing said movable core toward said yoke member;

one of said confronting ends being formed therein with an annular recess of a V-shaped cross-section forming a cylindrical inner surface and a conical outer surface convergent toward the other end, and the other end further comprising an annular projection corresponding in cross-section with the cross-section of said annular recess and forming a cylindrical outer surface and a conical inner surface respectively disposed in a parallel relationship with said cylindrical inner surface and with said conical outer surface of said one end;

wherein said cylindrical inner surface is arranged to increase an annular area of said cylindrical outer surface overlapped therewith in accordance with axial displacement of said movable core toward said stationary core, and wherein the inner periphery of said yoke member is further arranged to increase an annular area of the outer periphery of the other end of said movable core overlapped therewith in accordance with the axial displacement of said movable core toward said stationary core.

* * * * *